Figure 1:
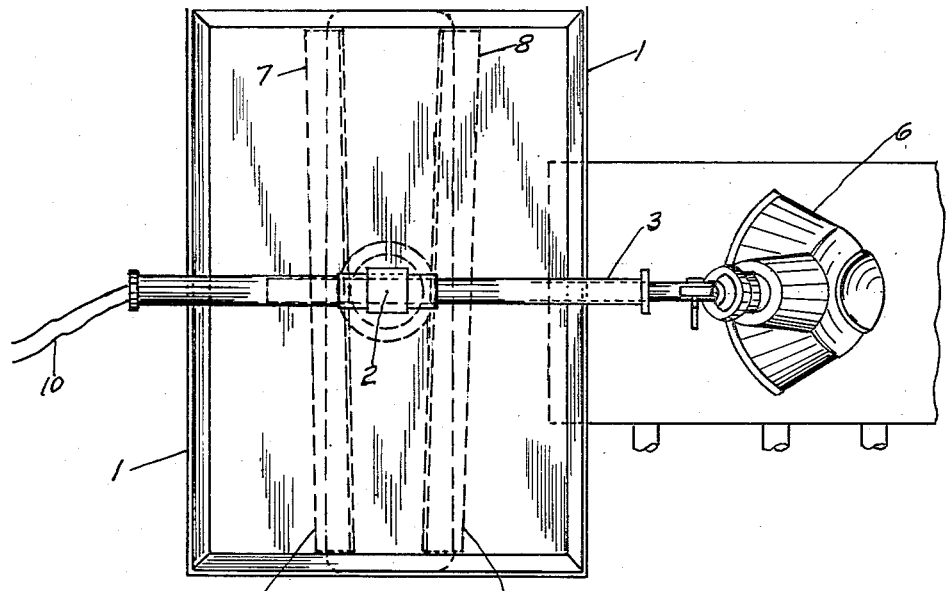

March 18, 1958   F. B. KERSEY   2,827,556
AUTOMOBILE REPAIR TRAY WITH LIGHT
Filed July 16, 1956   2 Sheets-Sheet 1

INVENTOR.
Frank B. Kersey
BY Chas. Denegre
Attorney.

March 18, 1958   F. B. KERSEY   2,827,556
AUTOMOBILE REPAIR TRAY WITH LIGHT
Filed July 16, 1956   2 Sheets-Sheet 2
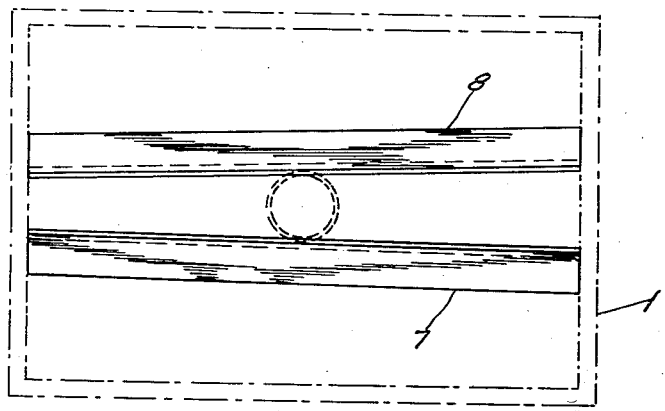
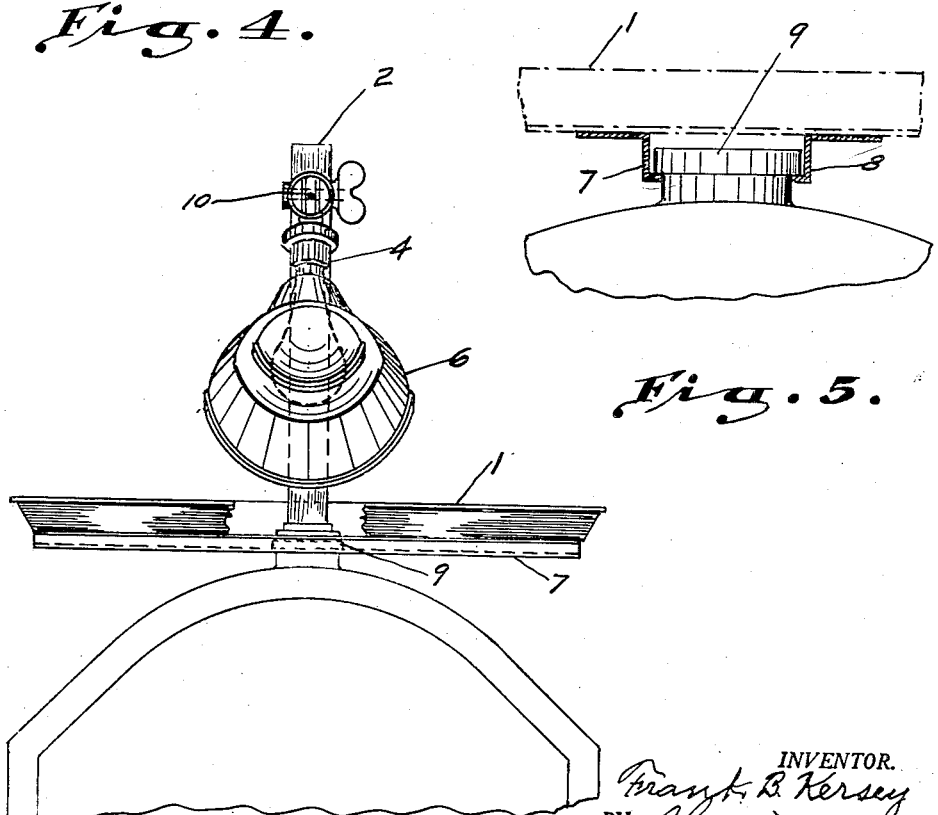
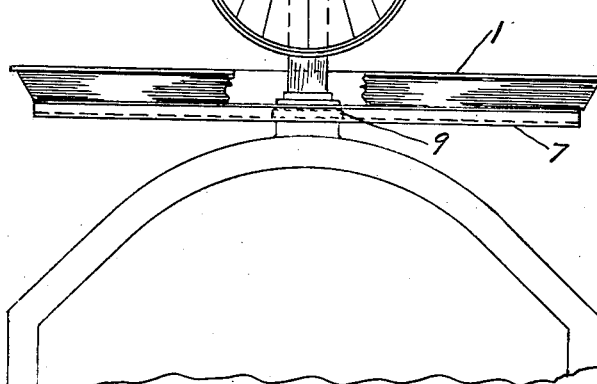
INVENTOR.
Frank B. Kersey
BY Chas. Denegre
Attorney.

United States Patent Office 2,827,556
Patented Mar. 18, 1958

2,827,556

AUTOMOBILE REPAIR TRAY WITH LIGHT

Frank B. Kersey, Birmingham, Ala.

Application July 16, 1956, Serial No. 598,181

2 Claims. (Cl. 240—2)

This invention relates to an automobile repair tray with light. It has for its main objects to provide such a device that will be highly satisfactory for the purpose intended, simple in structure, cheap to manufacture, easy to install for use and keep in serviceable condition, and extremely durable.

When it is necessary for an automobile mechanic to make adjustments and repairs of a minor nature to the parts under the hood, it is of much help to have a convenient way of having his tools in easy reach. The present invention provides easy means for taking care of such a condition.

Other objects and advantages will appear from the drawing and description.

Figure 2:
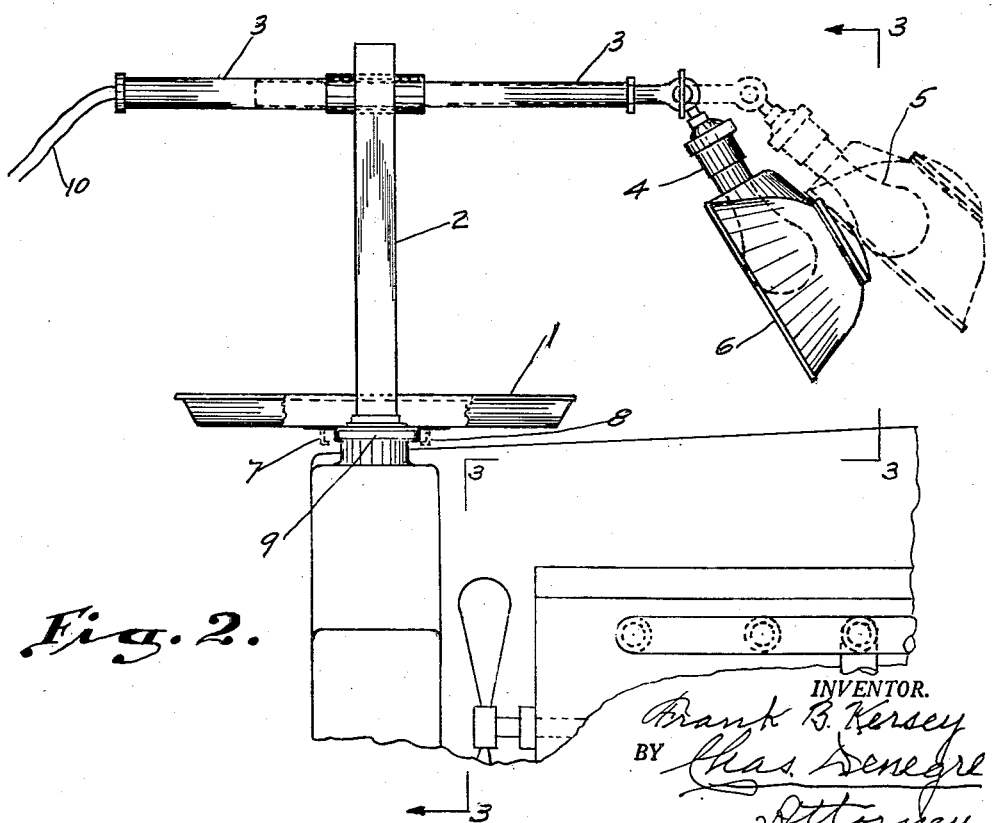

By referring generally to the drawing it will be observed that Fig. 1 is a plan view of the present invention showing the tray and adjustable light and the outline of the top of an automobile motor; Fig. 2 is a side elevational view showing the tray, support therefor, light with telescoping support, and outline of an automobile motor upper portion, radiator, and fan; Fig. 3 is a view of line 3—3—3 of Fig. 2; Fig. 4 is a plan view of the tapered positioned channels for removably holding the tray and light on the top of a radiator; and Fig. 5 is a detailed view showing how the tapered channels fit partly around the top flange of a radiator with its cap removed.

Similar reference numerals refer to similar parts throughout the several views.

Referring to the drawing in detail it will be seen that the device comprises a tray 1 attached to the lower end of a supporting member 2 that has at its upper end a telescoping tube 3 that has an electric light socket 4 for a globe 5 and shade 6. Attached under the middle portion of the tray are two channels 7 and 8 positioned in a tapered condition to thus provide tight fitting means for holding the device for use mounted on the top of a radiator flange 9 as plainly shown in Fig. 2. Electric current from an independent source is supplied through wire 10 to the globe.

From the foregoing it will appear that for use of the device a mechanic raises the hood of the automobile, then removes the radiator cap, then mounts the channels tightly on the regular flange of the radiator. The light may be used if necessary. Two pairs of channels may be used if desired.

The various parts of the device may be made of any material suitable for the purpose, but I prefer to use light weight metal or other light weight material, and regular electric light fixtures; also the parts may be made in different sizes and capacities depending on how and where to be used.

While I have shown and described the preferred embodiment of my invention, I do not wish to limit same to the exact and precise details of structure, and reserve the right to make all modifications and changes so long as they remain within the scope of the invention and the following claims.

Having described my invention I claim:

1. An automobile repair tray with electric light of the character described comprising a tray with a turned up edge, an upright supporting member, said tray attached by its middle portion to the lower end of said supporting member, two channels attached opposite each other to the face of the bottom of the tray, two opposite ends of said channels being nearer to each other than the other opposite ends to each other to thus form a tapered condition of the channels, said tapered channels being adapted to fit tightly on various sizes of cap receiving flanges on automobile radiators; a telescoping tube mounted in the upper end portion of said supporting member, an adjustable electric globe socket swingably attached to the end of the slidable portion of said telescoping tube, an electric light globe in said socket, an electric current supply wire inserted through said telescoping tube with an end of the wire connected to said light globe.

2. A mechanic's service device of the character described for use removably attached to the top flange or collar of an automobile radiator and comprising a tray with a turned up edge, an upright supporting member, said tray attached by its middle portion to the lower end of said supporting member, two channels attached opposite each other to the face of the bottom of the tray, two opposite ends of said channels being nearer to each other than the other opposite ends to each other to thus form a tapered condition of the channels, said tapered channels being adapted to fit tightly on various sizes of cap receiving flanges on automobile radiators; a telescoping tube mounted in the upper end portion of said supporting member, an adjustable electric globe socket swingably attached to the end of the slidable portion of said telescoping tube, an electric light globe in said socket, an electric current supply wire inserted through said telescoping tube with an end of the wire connected to said light globe.

References Cited in the file of this patent

UNITED STATES PATENTS

| 1,073,013 | Andres | Sept. 9, 1913 |
| 1,133,302 | Mann | Mar. 30, 1915 |
| 1,398,011 | Errington | Nov. 22, 1921 |
| 1,521,323 | Reeder | Dec. 30, 1924 |
| 1,858,232 | Piombo | May 10, 1932 |
| 1,951,662 | Krick | Mar. 20, 1934 |

FOREIGN PATENTS

| 483,738 | Great Britain | Apr. 26, 1938 |